United States Patent
Chen

(10) Patent No.: US 10,640,060 B2
(45) Date of Patent: May 5, 2020

(54) VEHICLE REPAIR SHOP PRE-INSPECTION AND POST-INSPECTION VERIFICATION SYSTEM

(71) Applicant: Innova Electronics Corporation, Irvine, CA (US)

(72) Inventor: Ieon C. Chen, Laguna Hills, CA (US)

(73) Assignee: Innova Electronics Corporation, Irvine, CA (US)

( * ) Notice: Subject to any disclaimer, the term of this patent is extended or adjusted under 35 U.S.C. 154(b) by 216 days.

(21) Appl. No.: 15/453,634

(22) Filed: Mar. 8, 2017

(65) Prior Publication Data
US 2017/0267192 A1 Sep. 21, 2017

Related U.S. Application Data

(60) Provisional application No. 62/311,253, filed on Mar. 21, 2016, provisional application No. 62/309,910, filed on Mar. 17, 2016.

(51) Int. Cl.
*B60R 16/023* (2006.01)
*G07C 5/00* (2006.01)
*G07C 5/08* (2006.01)

(52) U.S. Cl.
CPC .......... *B60R 16/0234* (2013.01); *G07C 5/006* (2013.01); *G07C 5/008* (2013.01); *G07C 5/085* (2013.01); *G07C 5/0808* (2013.01)

(58) Field of Classification Search
CPC .... B60R 16/0234; G07C 5/006; G07C 5/008; G07C 5/0808; G07C 5/085
See application file for complete search history.

(56) References Cited

U.S. PATENT DOCUMENTS

| | | |
|---|---|---|
| D334,560 S | 4/1993 | Wilson |
| 5,347,211 A | 9/1994 | Jakubowski |
| D377,622 S | 1/1997 | Chen |
| 5,635,841 A | 6/1997 | Taylor |
| 5,758,300 A | 5/1998 | Abe |
| 5,767,681 A | 6/1998 | Huang |
| 5,809,437 A | 9/1998 | Breed |
| 5,859,628 A | 1/1999 | Ross et al. |
| 5,884,202 A | 3/1999 | Arjomand |
| 5,890,080 A * | 3/1999 | Coverdill ............... B60T 8/885 701/31.4 |
| 5,991,673 A * | 11/1999 | Koopman, Jr. ......... B60R 25/00 701/29.6 |
| 6,000,413 A | 12/1999 | Chen |
| 6,055,468 A | 4/2000 | Kaman et al. |
| 6,094,609 A | 7/2000 | Arjomand |

(Continued)

FOREIGN PATENT DOCUMENTS

WO    WO 0186576    11/2001

*Primary Examiner* — Sze-Hon Kong
(74) *Attorney, Agent, or Firm* — Stetina Brunda Garred and Brucker; Mark B. Garred

(57) ABSTRACT

A verification system for verifying the thoroughness of automotive repairs. The system is adapted to retrieve electronic data and information from an onboard automobile computer or electronic system after a purported repair has been completed. The presence of fault codes or other problem data is an indication that such repairs have not been completed, while the absence of such fault codes or problem data is an indication that the repairs have been completed thoroughly.

17 Claims, 3 Drawing Sheets

(56) References Cited

U.S. PATENT DOCUMENTS

| | | |
|---|---|---|
| 6,169,943 B1 | 1/2001 | Simon et al. |
| 6,225,898 B1 | 5/2001 | Kamiya et al. |
| 6,263,268 B1 | 7/2001 | Nathanson |
| 6,287,389 B1* | 9/2001 | McGuire ............... B08B 3/024 |
| | | 134/18 |
| 6,389,337 B1 | 5/2002 | Kolls |
| 6,438,471 B1 | 8/2002 | Katagishi et al. |
| 6,499,385 B2 | 12/2002 | Protti |
| 6,535,112 B1 | 3/2003 | Rothshink |
| 6,587,768 B2 | 7/2003 | Chene et al. |
| 6,609,051 B2 | 8/2003 | Fiechter et al. |
| 6,611,740 B2 | 8/2003 | Lowrey et al. |
| 6,650,318 B1 | 11/2003 | Arnon |
| 6,718,425 B1 | 4/2004 | Pajakowski et al. |
| 6,732,031 B1 | 5/2004 | Lightner et al. |
| 6,807,469 B2 | 10/2004 | Funkhouser et al. |
| 6,836,708 B2 | 12/2004 | Tripathi |
| 6,847,916 B1 | 1/2005 | Ying |
| 6,868,369 B2 | 3/2005 | Huang |
| 6,925,368 B2 | 8/2005 | Funkhouser et al. |
| 6,940,270 B2 | 9/2005 | Chen |
| D510,287 S | 10/2005 | Chen |
| 6,957,133 B1 | 10/2005 | Hunt et al. |
| 6,968,733 B2 | 11/2005 | Andreasen |
| 7,030,742 B2 | 4/2006 | Treadway |
| 7,085,680 B2 | 8/2006 | Huang |
| 7,116,216 B2 | 10/2006 | Andreasen |
| 7,209,813 B2 | 4/2007 | Namaky |
| RE39,619 E | 5/2007 | Andreasen |
| D545,223 S | 6/2007 | Chen |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |
| 7,363,149 B2 | 4/2008 | Klausner et al. |
| D569,280 S | 5/2008 | Chen |
| 7,376,497 B2 | 5/2008 | Chen |
| D571,241 S | 6/2008 | Andreasen |
| 7,437,227 B2 | 10/2008 | Andreasen |
| D581,822 S | 12/2008 | Madison |
| 7,464,000 B2 | 12/2008 | Huang |
| D588,621 S | 3/2009 | Baty |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,577,581 B1 | 8/2009 | Schuyler |
| 7,603,293 B2 | 10/2009 | Chen |
| 7,620,484 B1 | 11/2009 | Chen |
| D610,586 S | 2/2010 | Chen |
| 7,711,462 B2 | 5/2010 | Daniels et al. |
| 7,734,390 B2 | 6/2010 | Chen |
| 7,778,750 B2 | 8/2010 | Knight et al. |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 7,904,219 B1 | 3/2011 | Lowrey et al. |
| 7,917,253 B2 | 3/2011 | Inbarajan et al. |
| 7,974,750 B2 | 7/2011 | Namaky |
| 8,019,503 B2 | 9/2011 | Andreasen |
| 8,024,083 B2 | 9/2011 | Chen |
| D646,188 S | 10/2011 | Chen |
| D646,599 S | 10/2011 | Chen |
| 8,032,419 B2 | 10/2011 | Chen |
| 8,068,951 B2 | 11/2011 | Chen et al. |
| 8,239,252 B2 | 8/2012 | Wellman |
| 8,301,329 B2 | 10/2012 | Andreasen |
| 8,306,687 B2 | 11/2012 | Chen |
| 8,370,018 B2 | 2/2013 | Andreasen et al. |
| 8,509,986 B1 | 8/2013 | Chen |
| 8,600,610 B2 | 12/2013 | Bertosa et al. |
| 8,630,765 B2 | 1/2014 | Chen |
| 8,798,852 B1* | 8/2014 | Chen ..................... G06F 21/44 |
| | | 701/29.6 |
| 8,811,008 B2 | 8/2014 | Selkirk et al. |
| 8,825,270 B2 | 9/2014 | Chen |
| 8,825,271 B2 | 9/2014 | Chen |
| 8,831,814 B2 | 9/2014 | Chen |
| 8,855,621 B2 | 10/2014 | Chen |
| 8,862,117 B2 | 10/2014 | Chen |
| 8,880,274 B2 | 11/2014 | Chen |
| 8,909,416 B2 | 12/2014 | Chen et al. |
| 9,002,554 B2 | 4/2015 | Chen |
| 9,014,908 B2 | 4/2015 | Chen |
| 9,026,400 B2 | 5/2015 | Chen et al. |
| 9,117,319 B2 | 8/2015 | Chen et al. |
| 9,123,051 B2 | 9/2015 | Chen |
| 9,141,503 B1 | 9/2015 | Chen |
| 9,142,066 B2 | 9/2015 | Chen et al. |
| 9,177,428 B2 | 11/2015 | Nguyen et al. |
| 9,183,681 B2 | 11/2015 | Fish |
| D745,029 S | 12/2015 | Gray et al. |
| D746,316 S | 12/2015 | Gray et al. |
| D746,323 S | 12/2015 | Gray et al. |
| 9,213,332 B2 | 12/2015 | Fish et al. |
| 9,213,447 B2 | 12/2015 | Chen |
| D747,734 S | 1/2016 | Gray et al. |
| D749,623 S | 2/2016 | Gray et al. |
| 9,262,254 B2 | 2/2016 | Bertosa et al. |
| 9,292,977 B2 | 3/2016 | Bertosa et al. |
| 9,324,194 B2 | 4/2016 | Pham |
| D757,059 S | 5/2016 | Gray et al. |
| 9,329,633 B2 | 5/2016 | Selkirk et al. |
| 9,342,934 B2 | 5/2016 | Chen |
| 9,384,599 B2 | 7/2016 | Chen et al. |
| D770,462 S | 11/2016 | Gray et al. |
| 9,494,125 B2 | 11/2016 | Pham et al. |
| 9,824,453 B1* | 11/2017 | Collins ..................... G06K 9/22 |
| 9,858,731 B2 | 1/2018 | Fish et al. |
| 9,904,634 B2 | 2/2018 | Case, Jr. et al. |
| 10,049,505 B1* | 8/2018 | Harvey .................. G07C 5/008 |
| 10,295,333 B2 | 5/2019 | Fish et al. |
| 10,467,906 B2 | 11/2019 | Fish et al. |
| 2002/0016655 A1 | 2/2002 | Joao |
| 2002/0193925 A1* | 12/2002 | Funkhouser ......... G07C 5/0808 |
| | | 701/31.8 |
| 2003/0156009 A1* | 8/2003 | Boulot .................... B60C 25/00 |
| | | 340/5.1 |
| 2003/0171111 A1 | 9/2003 | Clark |
| 2004/0110472 A1 | 6/2004 | Witkowski |
| 2005/0080519 A1* | 4/2005 | Oesterling .......... B60R 16/0231 |
| | | 701/1 |
| 2006/0235579 A1* | 10/2006 | Oesterling .......... B60R 16/0231 |
| | | 701/1 |
| 2009/0216399 A1* | 8/2009 | Ishikawa ............... G07C 5/0808 |
| | | 701/31.4 |
| 2009/0271051 A1* | 10/2009 | Teramura ................. B60R 25/04 |
| | | 701/1 |
| 2010/0082199 A1* | 4/2010 | Ito .......................... G07C 5/008 |
| | | 701/31.4 |
| 2011/0060569 A1* | 3/2011 | Lynn ................... G06F 11/0739 |
| | | 703/6 |
| 2011/0161182 A1 | 6/2011 | Racco |
| 2011/0288909 A1* | 11/2011 | Hedley ............... G06Q 30/0283 |
| | | 705/13 |
| 2012/0046982 A1 | 2/2012 | Wellman |
| 2012/0123611 A1* | 5/2012 | Grasso .................... B60R 25/00 |
| | | 701/1 |
| 2013/0145482 A1* | 6/2013 | Ricci ....................... H04W 4/90 |
| | | 726/28 |
| 2014/0046800 A1 | 2/2014 | Chen |
| 2014/0067195 A1 | 3/2014 | James et al. |
| 2014/0324278 A1* | 10/2014 | Teng ...................... G07C 5/008 |
| | | 701/31.5 |
| 2015/0317739 A1* | 11/2015 | Lawlor ............... G06Q 30/0283 |
| | | 705/4 |
| 2016/0027223 A1* | 1/2016 | Madison ................... G07C 5/12 |
| | | 701/29.6 |
| 2016/0055684 A1* | 2/2016 | Chen .................... G07C 5/0808 |
| | | 701/31.6 |

(56) References Cited

U.S. PATENT DOCUMENTS

| | | | |
|---|---|---|---|
| 2016/0078403 A1* | 3/2016 | Sethi | G06Q 10/0875 |
| | | | 705/26.81 |
| 2016/0104328 A1 | 4/2016 | Chen et al. | |
| 2016/0147521 A1* | 5/2016 | Hieronymi | G07C 5/008 |
| | | | 717/177 |
| 2016/0188195 A1 | 6/2016 | Chen | |
| 2016/0189440 A1* | 6/2016 | Cattone | G07C 5/008 |
| | | | 701/31.5 |
| 2016/0342834 A1* | 11/2016 | Ragnet | G06K 9/00463 |
| 2017/0031997 A1* | 2/2017 | Merg | G07C 5/008 |
| 2017/0046810 A1* | 2/2017 | Vitet | G06Q 50/265 |
| 2017/0090458 A1* | 3/2017 | Lim | G05B 23/0232 |
| 2017/0132578 A1* | 5/2017 | Merg | G06F 16/285 |
| 2017/0148102 A1* | 5/2017 | Franke | G06Q 10/20 |
| 2017/0154481 A1* | 6/2017 | Chen | G07C 5/0841 |
| 2017/0186054 A1 | 6/2017 | Fish et al. | |
| 2017/0228410 A1* | 8/2017 | Slusar | G07C 5/008 |
| 2017/0294059 A1* | 10/2017 | Noyelle | H04W 76/10 |
| 2018/0101775 A1 | 4/2018 | Fish | |
| 2018/0225891 A1* | 8/2018 | Lambourne | G07C 5/008 |
| 2019/0114494 A1* | 4/2019 | Ueta | G06F 16/532 |
| 2019/0287320 A1* | 9/2019 | Slusar | G07C 5/008 |

\* cited by examiner

VEHICLE REPAIR SHOP PRE-INSPECTION AND POST-INSPECTION VERIFICATION SYSTEM

CROSS-REFERENCE TO RELATED APPLICATIONS

This application claims priority to U.S. application Ser. No. 62/309.910, filed Mar. 17, 2016, and U.S. application Ser. No. 62/311,253, filed Mar. 21, 2016, both of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a vehicle repair verification system, and more specifically to a system of verifying whether electrical and/or mechanical repairs have been completed on an automobile.

2. Description of the Related Art

Traditionally, cars involved in an accident are brought to a body shop where the car is inspected to identify broken or damaged parts. The inspection may be validated by an insurance representative, or the body shop may be preapproved to presume that the damage assessment at the body shop is accurate.

Once the necessary repairs are validated, a traditional body shop would make the repairs, and possibly repair or replace damaged automotive systems. The car would then be returned to the owner.

More recently, the importance of sensor systems in relation to vehicle safety systems, such as collision avoidance systems, may make it necessary to validate the operation of those sensors and related control systems as part of the repair process. Failure to do so not only jeopardizes the safety of the passengers of the vehicle, but also poses significant liability exposure to the body shop and the insurer which bears some responsibility for the adequacy of the repairs.

The growing popularity of features and function-rich vehicles which heavily rely on up to seventy (70) or more sensors and/or electronic control units (ECUs) and related control systems to facilitate various functionalities of the vehicle makes even more essential that sensor or ECU systems be returned to proper operation after repairs of been made.

In short, the traditional approach of implementing repair by swapping out broken parts and restoring the car's internal and external appearance is no longer sufficient in relation to more complex cars. It is necessary to ensure that the sensors electronic systems, i.e., the brain and nervous system of the car, are compatible with all replacement parts and properly operational before cars put back into service.

The vehicle ECU is instrumental in checking on the condition of vehicle sensors and other intelligence systems in a vehicle. Where a system is found to be absent, or broken, the vehicle will typically generate a digital trouble code (DTC) indicating the indicating that such a condition exists. Some professional organizations, have developed programs, such as the Specialty Equipment Manufacturers Association (SEMA), known as the Vehicle Dynamics Program, which is intended to determine how different aftermarket products interact with other vehicle systems in relation to vehicle safety and Federal standards, to help determine if a repaired vehicle is roadworthy. The application of programs such as the SEMA Vehicle Dynamics Program, to the vehicle collision and insurance industries marks an evolution of vehicle repairs/onboard, allowing integration of the conventional vehicle repair processes with vehicle safety systems including a slew of ECUs, sensors, cameras and electronic controls, all of which need to cooperate in order to achieve proper operation.

Accordingly, there is a need in the art for a system of verifying that the electrical repairs for an automobile have been completed. Various aspects of the present disclosure address this particular need, as will be discussed in more detail below.

BRIEF SUMMARY

In accordance with one embodiment of the present disclosure, there is provided a verification system for verifying the thoroughness of automotive repairs, which may, at least in part, be based on the VIN. The system is adapted to retrieve electronic data and information from an onboard automobile computer or electronic system after a purported repair has been completed. The presence of fault codes or other problem data is an indication that such repairs have not been completed, while the absence of such fault codes or problem data is an indication that the repairs have been completed thoroughly.

According to one embodiment, based on the VIN, the system includes a database adapted to receive automobile data and information, as well as pictures associated with the automobile that is to be repaired. A report generating module may generate a "before-repair" report including the pictures, and any fault codes associated with electrical components needing repair. The report generating module may also generate an "after-repair" report including pictures and any fault codes associated with electrical components still needing repair.

An automobile verification module may compare automobile identification information retrieved from multiple sources on the automobile to verify the identity and authenticity of the automobile equipment, both before repair and after repair.

According to another embodiment, there is provided a method of determining a repair status of a vehicle. The method comprises the steps of receiving, at a database, diagnostic data generated by the vehicle at a first time, the diagnostic data including vehicle identification information associated with the vehicle; identifying at the database stored component identification information associated with the vehicle identification information; identifying at least one vehicle repair based on the diagnostic data received at the first time; receiving, at the database, one of: diagnostic data generated by the vehicle indicating a vehicle malfunction at a second time; and a signal indicating an absence of diagnostic data at the second time; where the diagnostic data indicating a vehicle malfunction is generated at the second time, generating a first incomplete alert signal in response to receipt of diagnostic data indicating a vehicle malfunction generated by the vehicle at the second time; receiving, at the database, installed component identification information associated with at least one electrical component installed on the vehicle; and comparing, at the database, the stored component identification information with the installed component identification information to determine if the at least one electrical component installed on the vehicle is compatible with the vehicle.

The step of receiving diagnostic data may include receiving diagnostic trouble codes generated by an electronic control unit of the vehicle.

The step of receiving diagnostic data may include receiving an electronic vehicle identification number from an electronic control unit of the vehicle.

The step of receiving component identification information may include receiving an electronic part number.

The method may further include the step of generating an incompatibility alert signal when the installed component identification information is does not match the stored component identification information.

The step of determining compatibility may include identifying stored identification information, and comparing the installed component identification information with the identified stored identification information. The step of identifying stored identification information may be based on the received vehicle identification information associated with the vehicle. The method may further include the step of generating an incompatibility alert signal when the installed component identification information does not match the identified stored identification information.

The method may additionally comprise the steps of: receiving a first photo of the vehicle; receiving a second photo of the vehicle taken subsequent to the first photo; and comparing the first and second photos to determine whether repairs are complete. The method may further comprise the step of generating a second incomplete alert signal when it is determined that repairs are incomplete.

The method may include the step of verifying the vehicle identification information associated with the vehicle by comparing different sets of vehicle identification information retrieved from the vehicle at different times.

The method may comprise the step of testing an electrical component of the vehicle by sending an electronic input signal to the electrical component. The method may additionally include the step of receiving a response signal from the electrical component and comparing the received response signal to a predetermined standard.

According to another embodiment, there is provided a method of verifying electrical components on a vehicle. The method includes the steps of receiving vehicle identification information associated with the vehicle; receiving, from the vehicle, installed component identification information associated with at least one electrical component installed on the vehicle; accessing a database having stored compatible component identification information associated with the vehicle; and comparing the compatible component identification information with the installed component identification information to determine if the at least one electrical component installed on the vehicle is compatible with the vehicle.

The method may further comprise the step of generating an alert when the installed component identification information does not correspond to the stored component identification information associated with the received vehicle identification information.

The installed component identification information may be associated with a quality characteristic and the compatible component identification information stored on the database may be associated with a preset quality characteristic, the method may further include the step of comparing the quality characteristic associated with the installed component identification information with the preset quality characteristic. The method may also include the steps of: accessing, in a database, stored performance data associated with the stored component identification information; receiving performance data from the at least one electrical component installed on the vehicle; and comparing the received performance data to the stored performance data to determine if the received performance data is consistent with the stored performance data to evaluate a quality characteristic of the component installed on the vehicle.

According to yet another embodiment, there is provided a method of verifying repair of a vehicle, with the method comprising the steps of: receiving diagnostic data from the vehicle; receiving a first component signal identifying electrical components on the vehicle at a first time; generating a repair list based on the received diagnostic data, the repair list including at least one electrical component requiring repair or replacement; receiving a second component signal identifying electrical components on the vehicle at a second moment; and comparing the first component signal with the second component signal to determine whether the at least one electrical component require has been repaired or replaced.

The method may additionally include the step of comparing the first component signal with the second component signal to determine whether the second component signal identifies at least one electrical component not included in the first component signal or the repair list.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 2A is a schematic representation of one embodiment of a Repair Report before repairs are completed;

FIG. 2B is a schematic representation of one embodiment of a Repair Report associated with an incomplete repair status, with the Repair Report indicating that certain repairs have not been completed or addressed and the VIN has been tampered with;

FIG. 2C is a schematic representation of one embodiment of a Repair Report associated with a complete repair status, with the Repair Report indicating that all repairs have been completed and the VIN has been verified.

Common reference numerals are used throughout the drawings and the detailed description to indicate the same elements.

DETAILED DESCRIPTION

Figure 1:
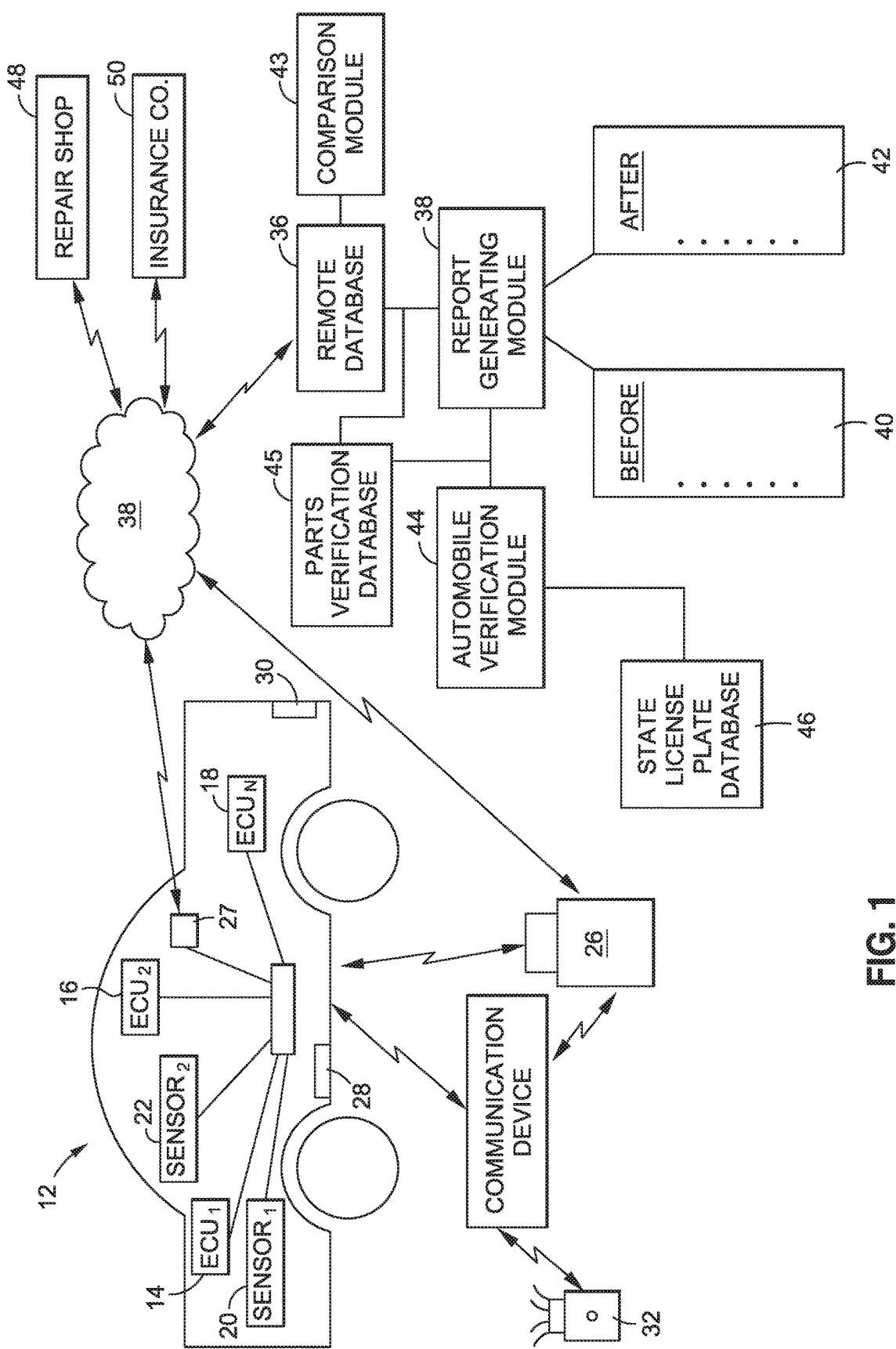
FIG. 1 is a schematic representation of one embodiment of a repair verification system for an automobile.

The detailed description set forth below in connection with the appended drawings is intended as a description of certain embodiments of a repair verification system for automobiles and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present disclosure only, and are not for purposes of limiting the same, there is depicted a repair verification system 10 for verifying repairs on an automobile 12. The repair verification system 10 is directed toward reviewing outputs from the electrical components on the automobile 12 after repairs have purportedly been completed to verify whether the alleged repairs have in fact been completed, or whether additional repairs are still required. The system 10 provides assurances to an owner of an automobile 12 that the electrical systems are repaired and ready for normal operation. Furthermore, insurance companies who may have a relationship with the repair shop may also benefit from the system 10, as it may mitigate their liability by ensuring the repair shop completes the repairs required for the automobile 12.

Referring now to FIG. 1, there is depicted a schematic view of the repair verification system 10. The automobile 12 includes several electrical components, including a first electronic control unit (ECU) 14, a second ECU 16, an nth ECU 18, a first electrical sensor 20, and an nth electrical sensor 22. Each ECU 14, 16, 18, and sensor 20, 22, may be associated with a respective system on the automobile 12. Exemplary electrical components include, but are not limited to, a mass airflow sensor, airbag deployment sensor, camera sensors(s), air-fuel ratio meters, blind spot monitors, crankshaft position sensor, engine coolant temperature sensor, hall effect sensor, pressure sensor(s), temperature sensor(s), oxygen sensor, throttle position sensor, tire pressure monitoring sensor, torque sensor, transmission fluid sensor, turbine speed sensor, variable reluctance sensor, speed sensor, water sensor, wheel speed sensor, any digital output device on the dashboard, including a display screen, gauge, etc. In some embodiments, each ECU 14, 16, 18 and sensor 20, 22 may be associated with an electronic parts number or other electronic identification code (e.g., an alphanumeric number or electronic signature).

The automobile 12 further includes an automobile data hub or CAN BUS 24, which may include a diagnostic port 24 *a* adapted to interface with a scan tool 26, diagnostic dongle, or other similar data retrieval devices. The automobile data hub or CAN BUS 24 is in communication with the various ECUs 14, 16, 18 and sensors 20, 22 to enable retrieval of data and information from the ECUs 14, 16, 18 and sensors 20, 22 via the hub 24. Some automobiles 12 may be equipped with a communication module 27 capable of uploading automobile data and information to a remote location. Exemplary communication modules include General Motors OnStar™, Lojack™, MyFord Touch™, Lexus Link™, and BMW Assist™.

The automobile 12 is associated with a Vehicle Identification Number (VIN), which is located at several locations on the automobile 12. In many instances, the VIN may be located behind the windshield, as well as in at least one door jamb 28. The VIN may be displayed in alphanumeric characters, as well as being displayed in an associated barcode, quick response (QR) code, or other scannable display. The VIN may also be stored on one of the ECUs 14, 16, 18 in an electronic format (referred to herein as the electronic VIN) and may be retrieved by the scan tool 26 through the data hub 24. The automobile 12 is further associated with a license plate 30 having an associated code, typically including alphanumeric characters, displayed thereon. The use of the VIN and the license plate will be described in more detail below.

The system 10 may include a camera 32 for capturing images of the automobile 12, as well as for enabling photo-capture of the VIN 28 and/or license plate 30. The VIN (in any format), the information included on the license plate 30, and any other information used to identify the vehicle (e.g., year, make, model, engine, trim, etc.), may be referred to as vehicle identification information.

A communication device 34 may be employed to upload automobile diagnostic data e.g., sensor data, diagnostic trouble codes, fault codes, live data, vehicle identification information, automobile information, VIN, part numbers, license plate information, and/or pictures to a remote location. It is understood that the communication device 34 may be capable of effectuating two-way communication with the remote location or remote device. The communication device 34 may include a handheld electronic device, smartphone, tablet computer, desktop computer, router, or other communications device known in the art. The communication device 34 may be able to interface with the scan tool 26 and camera 32 to receive data, information and pictures therefrom. Such interface may be via wireless communication, e.g., Bluetooth™, RF, Infrared, Wi-Fi, or other short range wireless communication means known in the art, as well as via wired communication means. The communication device 34 may also employ known long-range wireless communication circuitry to implement the uploading of the data, information and pictures to the remote storage database 36. Although the exemplary embodiment shows the camera 32 as being separate from the communication device 34, it is understood that the camera 32 may be incorporated into the communication device 34. Indeed, many smartphone, such as the Apple iPhone™ include cameras incorporated therein.

According to one embodiment, the communication device 34 communicates data and information retrieved from, or associated with, the automobile 12 to a remote storage database 36 via "the cloud" 38. As used herein, "the cloud" refers to Internet-based computing that provides shared processing resources and data/information to computers and other devices on demand. The automobile data and information may be stored on the remote storage database 36 and accessed by a report generating module 38. The report generating module 38 retrieves the data and information associated with a particular automobile 12 and organizes the information into a report, which may be time stamped and/or location stamped to show whether the report is completed before or after the purported repairs. In general, one report 40 is generated from automobile data and information before the repairs are performed (i.e., a first time), and is compared to another report 42 generated after the repairs are purportedly performed (i.e., a second time subsequent to the first time) to verify the integrity and thoroughness of the repairs. A comparison module 43 may also be in communication with the remote database 36, and the report generating module 38 to compare the data and information received before and after the repairs, and highlight any notable differences in the second report 42.

The VIN information and license plate information received at the remote storage database 36 may also be used by an automobile verification module 44 to ensure that all of the retrieved VINs from a given vehicle 12 (e.g., VINs extracted from multiple ECUs or electrical systems on the vehicle 12) match up with each other, as well as with the VIN associated with the license plate 30. In this regard, the automobile verification module 44 may access a state license plate database 46 having license plate information matched with VIN information to verify the correct VIN. Module 44 may also link to a VIN database 60 capable of decoding the year, make, model and/or engine of the automobile. The automobile verification module 44 may also be configured to verify that one or more electrical components on the vehicle 12 are compatible with the VIN.

All of the data, information, pictures and reports generated by the system 10 may be accessed through the cloud 38 by several entities, including but not limited to, a repair shop 48, an insurance company 50, and other third party service provider 48*a*.

With the general architecture of the system 10 described above, the following description will explain an exemplary use of the system 10. When the automobile 12 is in a collision or accident, the automobile 12 may sustain damage to the mechanical components as well as the electrical components. Typically, the owner of the automobile 12 has an automobile insurance policy, which at least partially covers repair of such damage. The insurance company may have a network of repair shops which are regularly used by clients of the insurance company for completing automobile repairs. As such, the insurance company may require the owner of the automobile to use a local repair shop within the network if the owner wants the insurance company to at least partially cover the repair costs.

Before the repairs are completed by the repair shop, photos are taken of the automobile 12 to capture at least some of the physical/mechanical damage sustained by the automobile 12. A picture may also be taken of the physical VIN (e.g., by the windshield or in the door jamb), and the license plate. If the automobile 12 includes a barcode or other scannable code associated with the VIN, such code may additionally be scanned prior to completing the repairs.

The scan tool 26 is then connected (wirelessly or via wired communication means) to the automobile 12 to retrieve data and information from the electrical components. In particular, "problem data" or diagnostic data is retrieved from the ECUs 14, 16, 18 and/or sensors 20, 22, with such problem/diagnostic data including diagnostic trouble codes (DTCs) or other codes generated in response to there being a problem with one or more of the related electrical components or systems. The scan tool 26 may also retrieve general operational data, e.g., live data, from the automobile 12, such as data generated by the ECUs 14, 16, 18 and/or sensors 20, 22 before the collision, and possibly during the collision and after the collision. It is understood that the retrieval of operational data is optional, and may not be retrieved by the scan tool 26 in other embodiments. Since such data is retrieved or gathered from the vehicle 12 before vehicle repairs are completed, this data is considered to be retrieved or gathered at a first time.

The scan tool 26 may also be used to retrieve information from the ECUs 14, 16, 18 and sensors 20, 22, with such information including the electronic VIN associated with the automobile 12, and/or part numbers/identification numbers associated with the ECUs 14, 16, 18 and/or sensors 20, 22.

The data, information, and pictures may be retrieved and captured by the owner of the automobile 12, an employee of the repair shop, an associate of the insurance company, or someone else associated with the repair of the automobile 12.

Once the data and information is retrieved by the scan tool 26, the data and information, along with the previously captured pictures and scanned data may be uploaded to the remote storage database 36. The communication device 34 and conventional Internet/Cloud-based communication resources may be used to effectuate the uploading of data and information from the scan tool 26 to the remote storage database 36.

Figure 2:
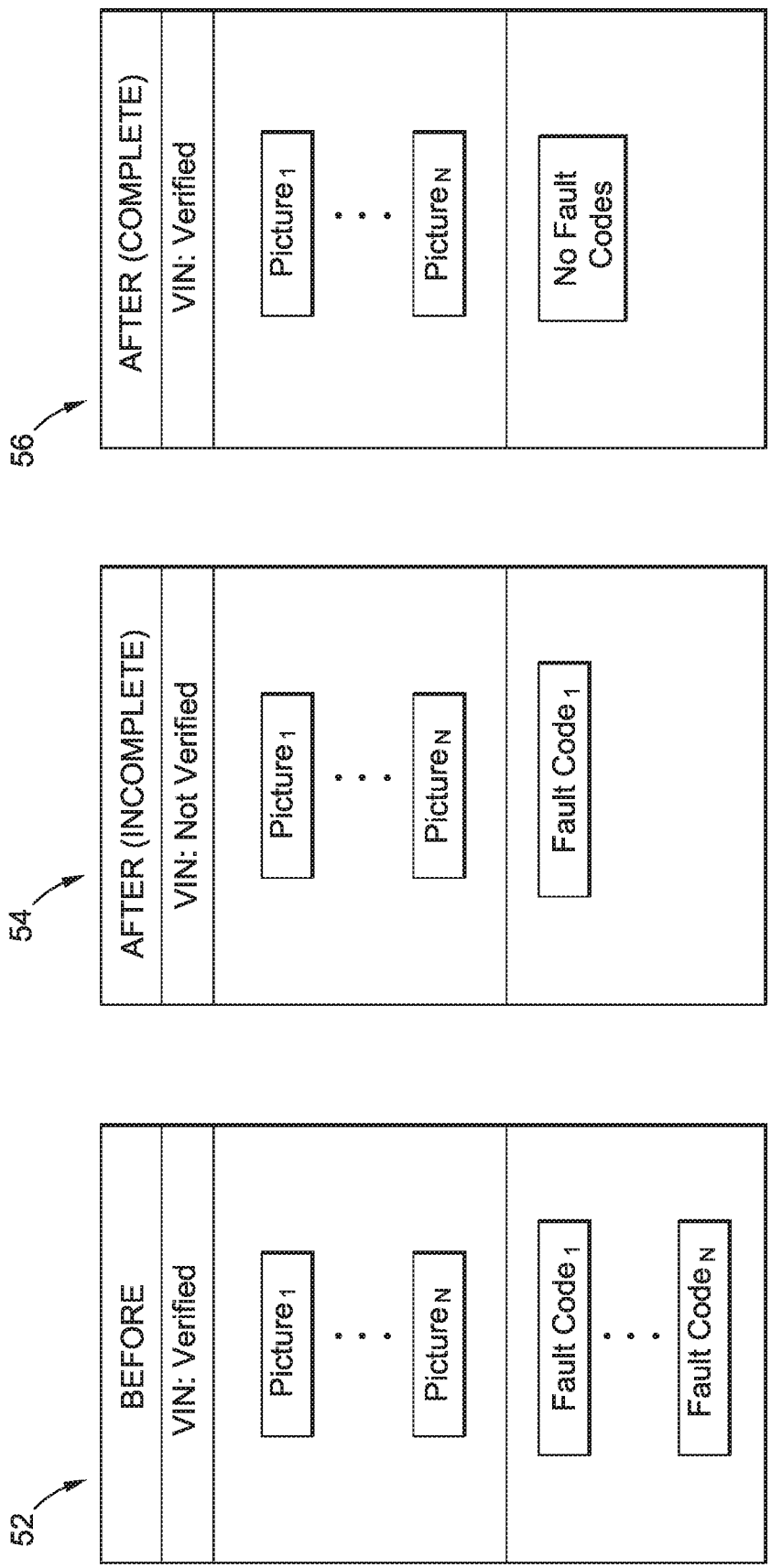
Figure 3:
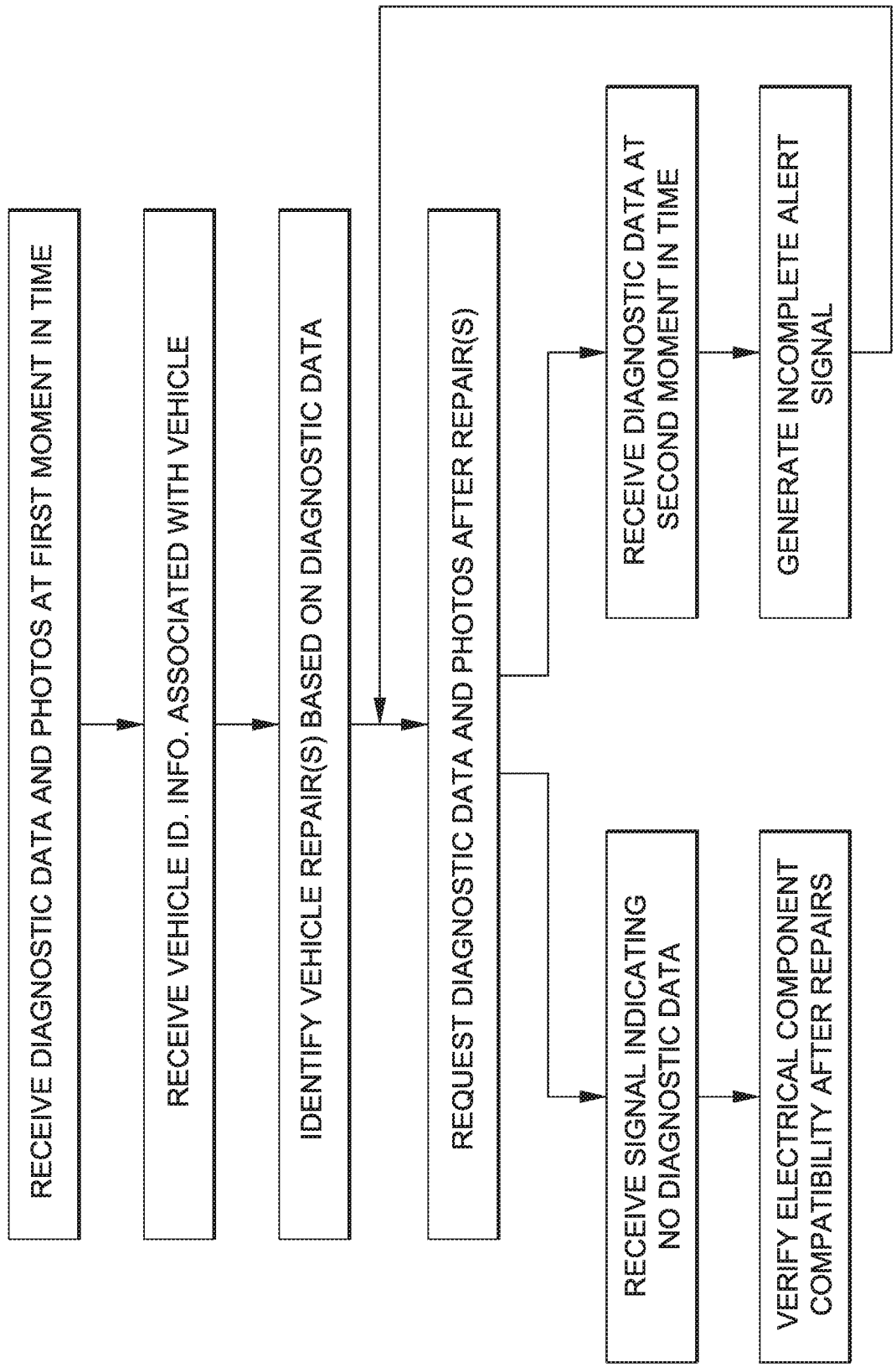
FIG. 3 is a flow chart of an exemplary embodiment of a method of verifying a repair in a vehicle.

The data, information, and pictures are stored on the remote storage database 36 and are accessed by a report generating module 38, which can generate a comprehensive report from the data, information, and pictures. Referring now to FIG. 2A, there is depicted a first report 52 generated from the pictures, data and information gathered before repairs are performed. The first report 52 indicates that the VIN information is verified, e.g., all of the VIN information and license plate information cross-matches with each other. Furthermore, the first report 52 includes Pictures 1-N that show areas of physical damage to the automobile 12 which require repair. The first report 52 also includes a list of fault codes 1-N, wherein each fault code is associated with an electrical component (e.g., ECU or sensor) which requires repair. In this regard, the report generating module 38 is capable of identifying at least one vehicle repair based on the diagnostic data received at the database 36.

The repair shop then completes the repairs on the automobile 12, including repairs to the physical/mechanical damage, as well as repairs to the electrical components. It is understood that some repair shops may not be capable of completing the repairs to the electrical components, and thus, such repairs may be completed by a dealership or other repair shop capable of making such repairs.

When repairs have purportedly been completed, data and information may be retrieved from the vehicle (at a second time), and from such data and information, the system 10 may generate a second report 54, which is shown in FIG. 2B. The second report 54 shows that the VIN is not verified, which is an indication that one of the sources of the VIN has likely been tampered with during the repair. For instance, if an ECU 14, 16, 18 has been fraudulently swapped out with another ECU associated with another VIN, the automobile verification module 44 and/or VIN database 60 will detect such deception and generate an incompatibility alert signal, which may be communicated to the owner of the vehicle and/or the associated insurance company. In that case, one of the retrieved VINs may not match with the others, or the retrieved VINs may not match with the license plate. When VIN tampering has been detected, the incompatibility alert signal may also be used to generate a report with the insurance company, and local crime authorities.

The second report 54 also includes pictures 1-N, preferably taken from the same locations/perspectives as the pictures 1-N in the first report 52. The pictures 1-N in the second report 54 enable quick and easy visual inspection of the areas which required physical repair on the automobile 12. For instance, if the automobile 12 repair requires replacement of a broken turn signal cover, a quick review and comparison of the pictures in the second report 54 enables determination of the completeness of such repairs. Another example may be an automobile which requires replacement of an automobile detection sensor on the bumper of the automobile 12. The picture in the second report 54 will at least show whether such sensor is present or is missing.

The second report 54 further includes a listing of any fault codes or "problem data" which may be retrieved from the automobile 12. When all of the repairs are complete, there should be no problem data retrieved from the automobile 12, e.g., the report should be devoid of any fault codes. Thus, the presence of such problem data/diagnostic data is an indication that the repairs have not been completed. For instance, when an automobile 12 is in a collision, the airbag may deploy. Thus, when the automobile 12 is repaired, the airbag may be replaced with a new airbag. However, since the airbag is concealed during normal operation of the automobile 12, the owner of the automobile may have no way of visually verifying that the airbag was actually replaced. However, some vehicles may be capable of generating an electrical signal representative of a missing airbag. Thus, the system 10 may remedy the aforementioned problem by retrieving such fault code, e.g., problem data, and making the owner aware of the missing airbag.

In sum, when the second report 54 is generated, it provides an objective assessment as to the incompleteness/thoroughness of the repairs, as well as an indication of potentially fraudulent behavior, in view of the VIN not being verified. Thus, the owner of the automobile 12 or the relevant insurance company can inquire with the repair shop as to why such repairs are incomplete.

Referring now to FIG. 2C, there is shown a third report 56, which is representative of the repairs being complete and the VIN being verified. In this regard, the completeness of the repairs is associated with the absence of fault codes or problem data in the report. As such, when all repairs are complete, a signal indicating an absence of diagnostic data may be generated by the vehicle 12 and received by the remote database 36.

Although the foregoing describes the use of a scan tool 26 to retrieve data and information from the ECUs 14, 16, 18 and sensors 20, 22, it is understood that in other embodiments, the data and information may be uploaded directly by the automobile 12 via the communication module 27. Alternatively, such data and information may be retrieved from the automobile 12 directly via the communication device 34, such as a smartphone having an application (i.e., app.) which allows the communication device 34 to retrieve data and information from the automobile 12. In this regard, the smartphone app. may include communication protocols necessary to communicate with one or more electrical components on the automobile 12.

Referring now to another implementation of the present disclosure, in certain automobiles 12 having sophisticated electronic systems, each ECU 12, 14, 16, as well as several sensors 20, 22, and other electrical components may be associated with a unique part identification number or code (hereinafter collectively referred to as part identification number). In this regard, the verification system 10 may be capable of tracking the part identification numbers of each electrical component. When repairing an electrical component, it may be desirable or a requirement to replace the electrical component with a replacement component having an identical or compatible part identification number. Should an electrical component be replaced with a replacement component that is not identical or compatible, a fault code may be generated, or other information may be retrieved from the vehicle 12 to alert the owner that a potentially inferior or incompatible electrical component has been installed. It is also contemplated that the comparison module 43 may be configured to compare the electronic identification information associated with the various electrical components/systems on the vehicle, and when a component is replaced, the comparison module 43 can identify such replacement. Moreover, when replacement of the electrical component has been identified, the comparison module 43 can also analyze the new electrical component and determine whether it is compatible with the vehicle 12, or if the new electrical component meets a predetermined quality standard. Although the foregoing describes verification of the electrical components in the context of vehicle repair, it is understood that the component verification functionality may be performed at any time. In this regard, a user can scan the vehicle at any time to identify the electrical components on the vehicle, and identify whether the identified electrical components are acceptable, meaning, are the components at the very least compatible with the vehicle identification information (e.g., year, make, model, engine, etc.), and secondly, whether the components are comply with any other standards (e.g., components meet certain ratings, are manufactured by certain manufacturers, etc.).

The component verification may include receiving vehicle identification information associated with the vehicle 12, and receiving component identification information associated with at least one electrical component on the vehicle. As noted above, the component identification information may be an electronic parts number or other identification. Parts verification database 45 may then be accessed, with the parts verification database 45 having stored compatible component identification information associated with vehicle identification information. The compatible component identification information associated with the received vehicle identification information stored on the database is then compared with the installed component identification information to determine if the electrical component on the vehicle 12 is compatible with the vehicle identification information.

An alert may be generated when the installed component identification information does not correspond to the compatible component identification information stored on the database associated with the received vehicle identification information.

To illustrate the component verification process, the following examples are provided. If the mass airflow sensor requires replacement, and the automobile 12 requires replacement with a genuine OEM mass airflow sensor or a specified alternative having parts identification numbers 120-125 installed in the automobile 12, a fault code may be generated after repair if the repair shop installs a mass airflow sensor having a parts identification number outside of 120-125. Alternatively, the comparison module 43 may be configured to identify the new mass airflow sensor as being sub-standard. An inferior, or unauthentic replacement may result in inefficient operation of the engine, and may cause problems over time. Accordingly, an incompatibility alert signal may be generated to alert the relevant parties. Therefore the ability to verify that the replacement parts are authentic or authorized alternatives is a powerful resource.

As another example relating to replacement of the airbag actuation sensor, the authentic or authorized replacement may trigger deployment of the airbag in response to a prescribed collision force, and may inflate the airbag at a prescribed pressure associated with the size of the airbag and responsiveness required of the airbag. If a non-authentic or unauthorized airbag actuation sensor is used, such sensor may be set to deploy the airbag in response to a different collision force, and at a different inflation speed and pressure, which may create extremely dangerous operating conditions. Therefore, the system 10 is capable of identifying when such dangerous, unauthorized replacement parts may be installed in the automobile. Furthermore, the system 10 provides the user with assurance that when they pay for authentic parts, that such authentic parts are actually used in the repair.

Although the foregoing describes a system which simply retrieves data and information from the automobile 12 for purposes of verifying repair completion, and/or component verification, it is also contemplated that in other embodiments, the system performs virtual testing on the automobile to determine the response of the electrical systems on the automobile. The detected response may be compared to predefined response goals to see if the electrical systems are acceptable. An exemplary virtual testing procedure which may be used in combination with the presently described system is the Specialty Equipment Market Association (SEMA) Vehicle Dynamics Program. The SEMA program is adapted to test the electronic stability control system of a vehicle by conducting a virtual test wherein a testing module sends electronic input signals to the vehicle and senses how certain electrical systems react to such inputs to determine whether the automobile meets the required performance standards.

Various aspects of the verification system described herein may prove to be useful in combination with virtual testing. In particular, electrical components and systems which have been repaired may undergo virtual testing to provide enhanced verification of the operability of such repaired systems.

The foregoing describes certain features of the system 10 which are intended to verify the completeness and thoroughness of repairs to a vehicle 12. However, it is additionally contemplated that certain aspects of the system 10 may also be used to ensure a repair shop does not perform unnecessary repairs on a vehicle 12. In this regard, prior to the repairs being performed, the system 10 may take a snapshot of the vehicle 12, including receiving diagnostic data, as well as a first component signal identifying the electrical components on the vehicle 12. The component signal may include a comprehensive identification of the electrical components of the vehicle 12, or alternatively, may include an identification of electrical components associated with a particular system. The received diagnostic data may be used to generate a repair list, including at least one electronic component requiring repair or replacement. In this regard, the repairs provided on the repair list are "authorized" repairs.

After the repairs are complete, data and information may be retrieved from the vehicle to ensure completeness of the repairs and that the repair shop did not perform any unauthorized repairs, i.e., that the repairs did not go beyond the scope of the repair list. To that end, a second component signal may be received identifying the electrical components on the vehicle after the repairs. The comparison module 43 may then compare the first component signal with the second component signal to determine whether the necessary components have been repaired or replaced, and to identify any unauthorized component replacement.

For instance, from the diagnostic data, it may be determined that the throttle position sensor and the tire pressure monitor sensor require replacement. Accordingly, the repair list would limit authorized replacement of the throttle position sensor and the tire pressure monitor sensor. However, after completing the repairs and receiving the second component signal, the comparison module 43 may determine that the turbine speed sensor was also replaced. Thus, when the comparison module 43 identifies that an unauthorized replacement has been made, it may generate an unauthorized work signal, which may be received by the owner of the vehicle, the insurance company, etc., to allow for investigation as to why such unauthorized repairs were performed.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of determining a repair status of a vehicle, the method comprising the steps of:
   receiving, at a database, diagnostic data generated by the vehicle at a first time, the diagnostic data including vehicle identification information associated with the vehicle;
   identifying, at the database, stored component identification information associated with the vehicle identification information;
   identifying an initial vehicle malfunction based on the diagnostic data generated by the vehicle at the first time;
   receiving, at the database, one of:
      diagnostic data generated by the vehicle at a second time indicating a subsequent vehicle malfunction; and
      a signal indicating an absence of diagnostic data at the second time;
   generating a first incomplete alert signal in response to receipt of diagnostic data generated by the vehicle at the second time indicating the subsequent vehicle malfunction;
   receiving, at the database, installed component identification information associated with at least one electrical component installed on the vehicle;
   comparing, at the database, the stored component identification information with the installed component identification information to determine if the at least one electrical component installed on the vehicle is compatible with the vehicle;
   verifying, at the database, the vehicle identification information associated with the vehicle by comparing different sets of vehicle identification information retrieved from the vehicle at different times; and
   generating, at the database, a verification signal based on the comparison of the different sets of vehicle identification information retrieved from the vehicle at different times.

2. The method recited in claim 1, wherein the step of receiving diagnostic data includes receiving diagnostic trouble codes generated by an electronic control unit of the vehicle.

3. The method recited in claim 1, wherein the step of receiving diagnostic data includes receiving an electronic vehicle identification number from an electronic control unit of the vehicle.

4. The method recited in claim 1, wherein the step of receiving component identification information includes receiving an electronic part number.

5. The method recited in claim 1, further comprising the step of generating an incompatibility alert signal when the installed component identification information does not match the stored component identification information.

6. The method recited in claim 1, further comprising the steps of:
   receiving a first photo of the vehicle;
   receiving a second photo of the vehicle taken subsequent to the first photo; and
   comparing the first and second photos to determine whether repairs are complete.

7. The method recited in claim 6, further comprising the step of generating a second incomplete alert signal when it is determined that repairs are not complete.

8. The method recited in claim 1, further comprising the step of testing an electrical component of the vehicle by sending an electronic input signal to the electrical component.

9. The method recited in claim 8, further comprising the step of receiving a response signal from the electrical component and comparing the received response signal to a predetermined standard.

10. A method of verifying electrical components on a vehicle, the method comprising the steps of:
receiving vehicle identification information associated with the vehicle;
receiving, from the vehicle, installed component identification information associated with at least one electrical component installed on the vehicle;
accessing a database having stored compatible component identification information associated with the vehicle; and
comparing the compatible component identification information with the installed component identification information to determine if the at least one electrical component installed on the vehicle is compatible with the vehicle;
generating, at the database, a component verification signal based on the comparison of the compatible component identification information with the installed component identification information; and
verifying the vehicle identification information associated with the vehicle by comparing different sets of vehicle identification information retrieved from the vehicle at different times.

11. The method recited in claim 10, further comprising the steps of:
accessing in a database stored performance data associated with the stored component identification information;
receiving performance data from the at least one electrical component installed on the vehicle; and
comparing the received performance data to the stored performance data to determine if the received performance data is consistent with the stored performance data to evaluate a quality characteristic of the component installed on the vehicle.

12. The method recited in claim 10, wherein the step of receiving vehicle identification information includes receiving a vehicle identification number.

13. The method recited in claim 10, wherein the step of receiving installed component identification information includes receiving an electronic part number.

14. A method of verifying repair of a vehicle, the method comprising the steps of:
receiving diagnostic data generated by the vehicle at a first time;
receiving a first component identification signal at a computer remote from the vehicle identifying electrical components on the vehicle at the first time;
generating, at the database remote from the vehicle, a repair list based on the received diagnostic data, the repair list including at least one electrical component requiring repair or replacement;
receiving diagnostic data generated by the vehicle at a second time;
receiving a second component identification signal identifying electrical components on the vehicle at the second time;
comparing, at the database remote from the vehicle, the first component identification signal with the second component identification signal to determine whether the at least one electrical component requiring repair or replacement has been repaired or replaced by a component compatible with the vehicle;
comparing, at the database remote from the vehicle, the diagnostic data generated by the vehicle at the first time with the diagnostic data generated by the vehicle at the second time to determine a repair completion status; and
verifying the vehicle identification information associated with the vehicle by comparing different sets of vehicle identification information retrieved from the vehicle at different times.

15. The method recited in claim 14, further comprising the step of comparing the first component identification signal with the second component identification signal to determine whether the second component identification signal identifies at least one electrical component not included in the first component identification signal or the repair list.

16. The method recited in claim 14, further comprising the steps of:
receiving a first photo of the vehicle;
receiving a second photo of the vehicle taken subsequent to the first photo; and
comparing the first and second photos to determine whether repairs are complete.

17. The method recited in claim 14, further comprising the steps of:
receiving vehicle identification information associated with the vehicle; and
determining compatibility of the electrical components associated with the received second component identification signal with the vehicle based on comparison of signal with vehicle compatible component information derived from the received vehicle identification information.

* * * * *